(12) United States Patent
Liao

(10) Patent No.: US 6,898,448 B2
(45) Date of Patent: May 24, 2005

(54) MINIATURE VOCAL TRANSMITTER DEVICE

(76) Inventor: Sheng Hsin Liao, No. 10, Alley 38, Lane 229, San Chun St., Shulin City Taipei Hsien (TW)

( * ) Notice: Subject to any disclaimer, the term of this patent is extended or adjusted under 35 U.S.C. 154(b) by 482 days.

(21) Appl. No.: 10/046,390

(22) Filed: Jan. 16, 2002

(65) Prior Publication Data

US 2003/0134603 A1 Jul. 17, 2003

(51) Int. Cl.[7] .............................................. H04M 1/00
(52) U.S. Cl. ..................... 455/575.6; 381/151; 381/326
(58) Field of Search ........................ 455/550.1, 575.1, 455/90.3, 575.6; 381/370, 374, 375, 380, 381, 355, 356, 369, 326, 151

(56) References Cited

U.S. PATENT DOCUMENTS 4,942,617 A * 7/1990 Boylan ....................... 381/182
6,439,491 B1 * 8/2002 Liao ........................... 242/378.1
6,633,770 B1 * 10/2003 Gitzinger et al. ............ 455/575.1
6,728,556 B1 * 4/2004 Whitley ...................... 455/575.1
2002/0080985 A1 * 6/2002 Ho ............................... 381/334
2004/0077382 A1 * 4/2004 Verity ......................... 455/569.1

* cited by examiner

Primary Examiner—Vivian Chin
Assistant Examiner—Lewis West
(74) Attorney, Agent, or Firm—Rosenberg, Klein & Lee

(57) ABSTRACT

A vocal transmitter device includes a cable-receiving structure, an earphone, a fastener and a microphone. The cable-receiving structure has a case, a cable-winding plate, a connection cable, and a spiral spring. The spiral spring and the cable-winding plate are arranged in the case and connected to each other. The earphone is connected to a terminal of the connection cable. The fastener is connected on the case of the cable-receiving structure. The microphone is arranged either in the case of the cable-receiving structure or in the fastener. Another terminal of the connection cable is connected to the microphone. A miniature vocal transmitter device is hence accomplished.

10 Claims, 10 Drawing Sheets

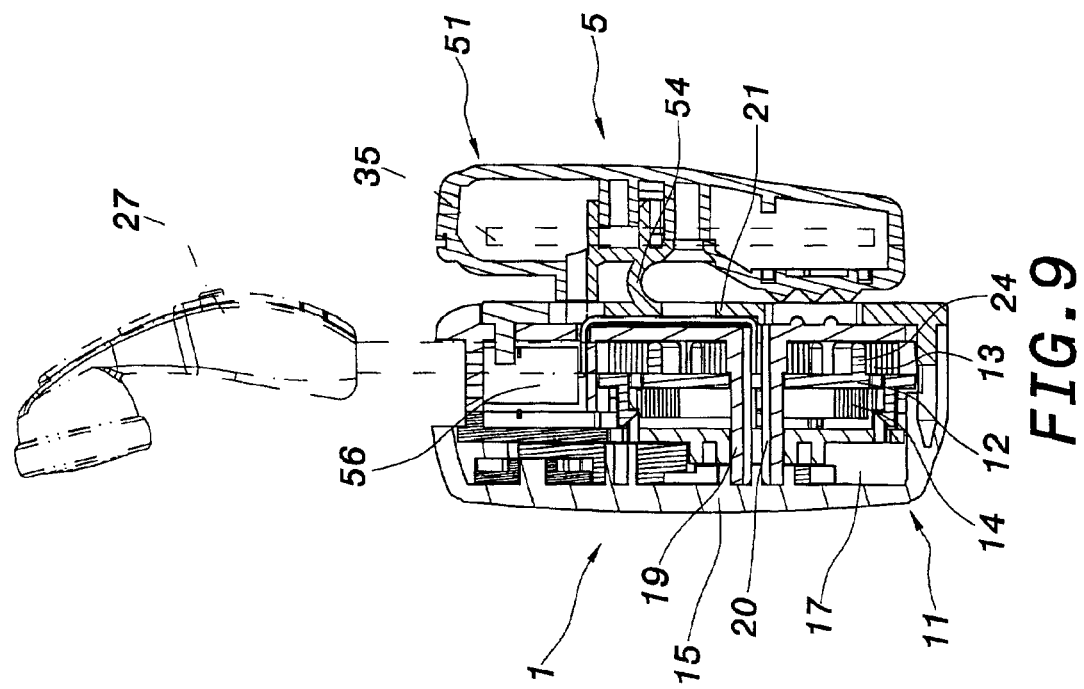

MINIATURE VOCAL TRANSMITTER DEVICE

BACKGROUND OF THE INVENTION

1. Field of the Invention

The present invention relates to a miniature vocal transmitter device having a cable-receiving structure. More particularly, to provide a vocal transmitter device that transmits messages by a microphone and an earphone, and further to enable easy pull out and retraction of a connection cable received therein.

2. Description of the Related Art

As electrical and telecommunication appliances become popular, connection cables are increasingly present in our environment to connect various types of devices. To prevent too long and numerous connection cables from being interlaced or knotted with one another or, on the contrary, to avoid too short connection cables incompatible with a practical use, the inventor of the present application has developed various types of cable-receiving structures for communication devices. The cable-receiving structures of the prior art are similarly based on a principal structure that comprises an outer case, a connection cable, a cable-winding plate, and a spiral spring. Therefore, the conventional connection cable, via a connector mounted on a terminal thereof, can connect a communication device.

Because the spring elements of the conventional cable-receiving structures exert a substantial retraction tension on the connection cables pulled out, the connection cables therefore usually cannot be outwardly held in a stable manner. A utilization of the connection cables can be thereby substantially impeded. To overcome the above problems, the inventor principally uses the engagement of a flexibly oscillating member into blocking notches defined on the cable-winding plate to perform winding or immobilizing of the pulled-out connection cable.

The conventional vocal transmitter device is not provided with a cable-receiving structure. The outer portion of the connection cable may be therefore inadvertently interlaced or knotted. Even if a cable-receiving structure is provided as disclosed above, the available cable-receiving structure however is larger in size, which renders its fastening on a user' collar inconvenient and difficult.

Therefore, there is a need to provide a vocal transmitter device having a cable-receiving structure without the inconveniences of the prior art.

SUMMARY OF THE INVENTION

It is therefore one object of the invention to provide a miniature is vocal transmitter device that can be clipped on a user's cloth such as a collar to transmit messages by use of a microphone and an earphone.

It is another object of the invention to provide a vocal transmitter device that is compact, convenient, and can further receive a connection cable to prevent interlaces and knotting of an externally extended portion of the connection cable.

To achieve the above and other objectives, a vocal transmitter device of the invention comprises a cable-receiving structure, an earphone, a fastener and a microphone. The cable-receiving structure includes a case, a cable-winding plate, a connection cable, and a spiral spring. The spiral spring and the cable-winding plate are arranged in the case and connected to each other. The connection cable is wound around the cable-winding plate. The earphone is connected to a terminal of the connection cable. The fastener is mounted to the case of the cable-receiving structure. The microphone is arranged either in the case of the cable-receiving structure or the fastener. Another terminal of the connection cable is connected to the microphone. A miniature vocal transmitter device hence is accomplished.

BRIEF DESCRIPTION OF THE DRAWINGS

The drawings included herein provide a further understanding of the invention and, incorporated herein, constitute a part of the invention disclosure. A brief introduction of the drawings is as follows:

FIG. 9 is a sectional view of a miniature vocal transmitter device according to a fourth embodiment of the invention.

DESCRIPTION OF THE PREFERRED EMBODIMENTS

Figure 1:
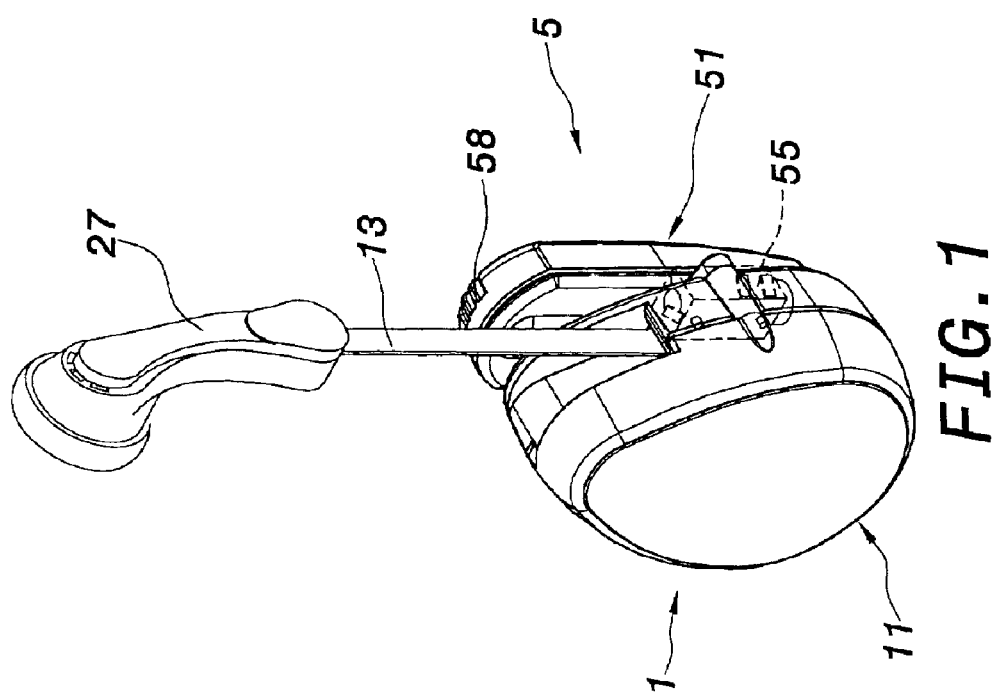
FIG. 1 is a perspective view of a miniature vocal transmitter device according to a first embodiment of the invention.

The following detailed description of the invention with reference to the accompanying drawings is only illustrative of specific structures and ways of making the invention, and does not limit the scope of the invention. Wherever possible in the description, like reference numerals will refer to like elements and parts unless otherwise illustrated.

Figure 2:
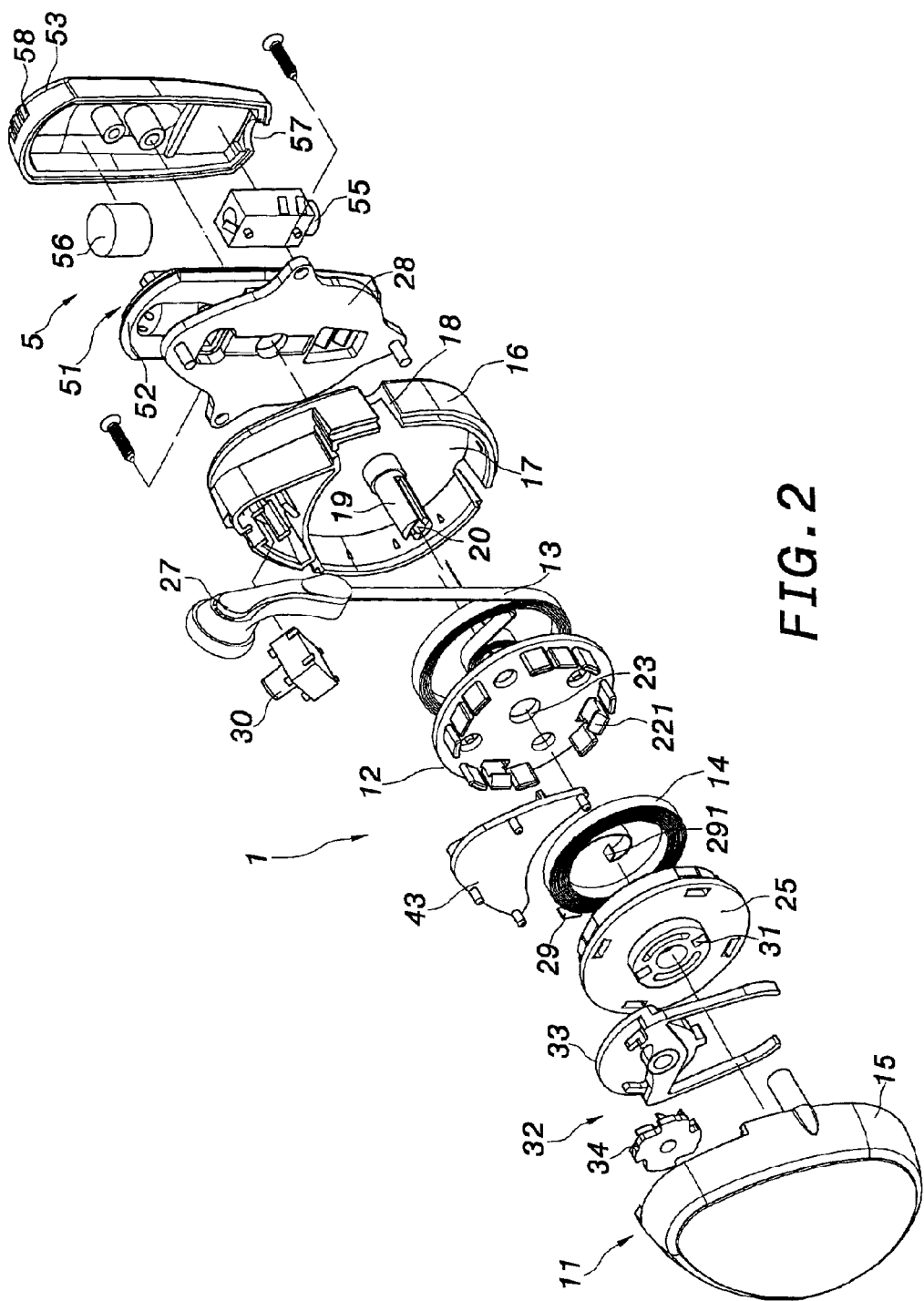
FIG. 2 is an exploded view of the miniature vocal transmitter device according to the first embodiment of the invention.
Figure 3:
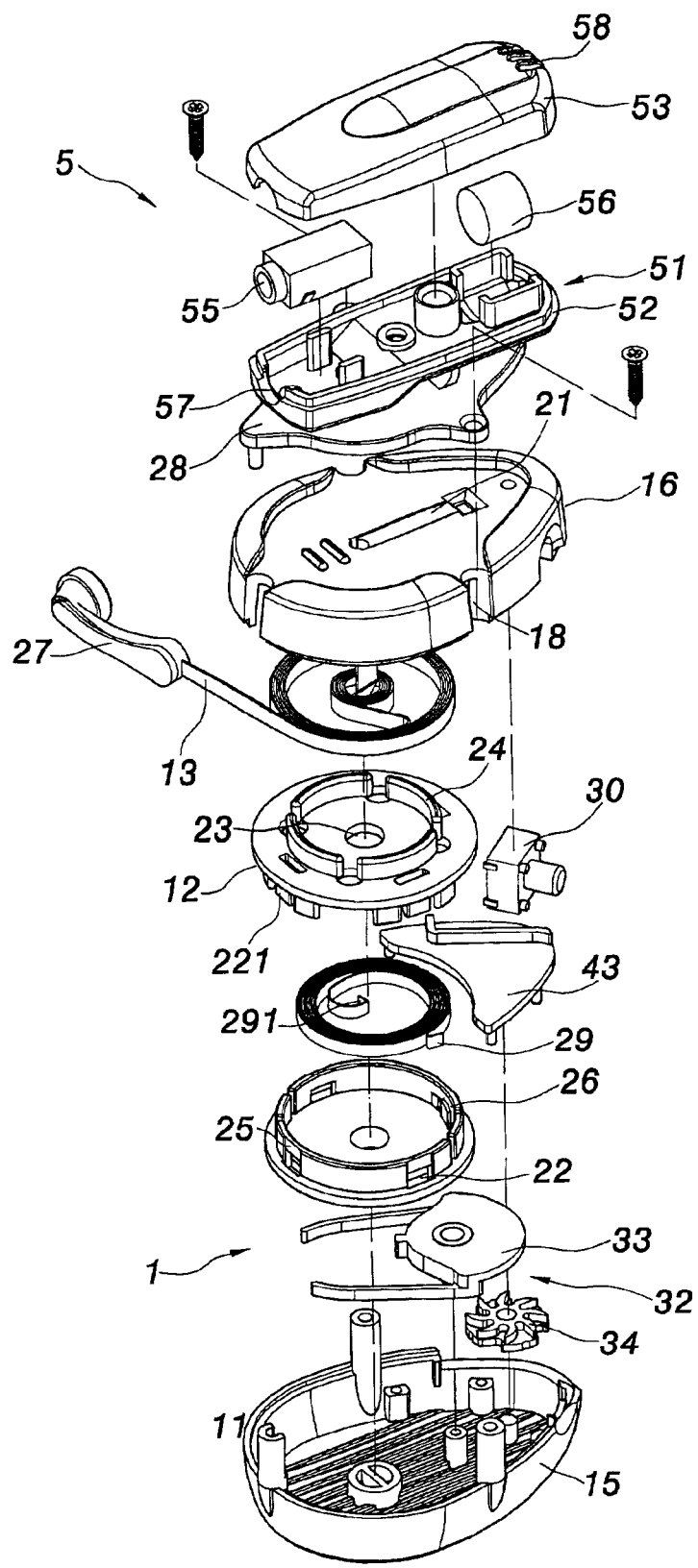
FIG. 3 is another exploded view of the miniature vocal transmitter device according to the first embodiment of the invention.
Figure 4:
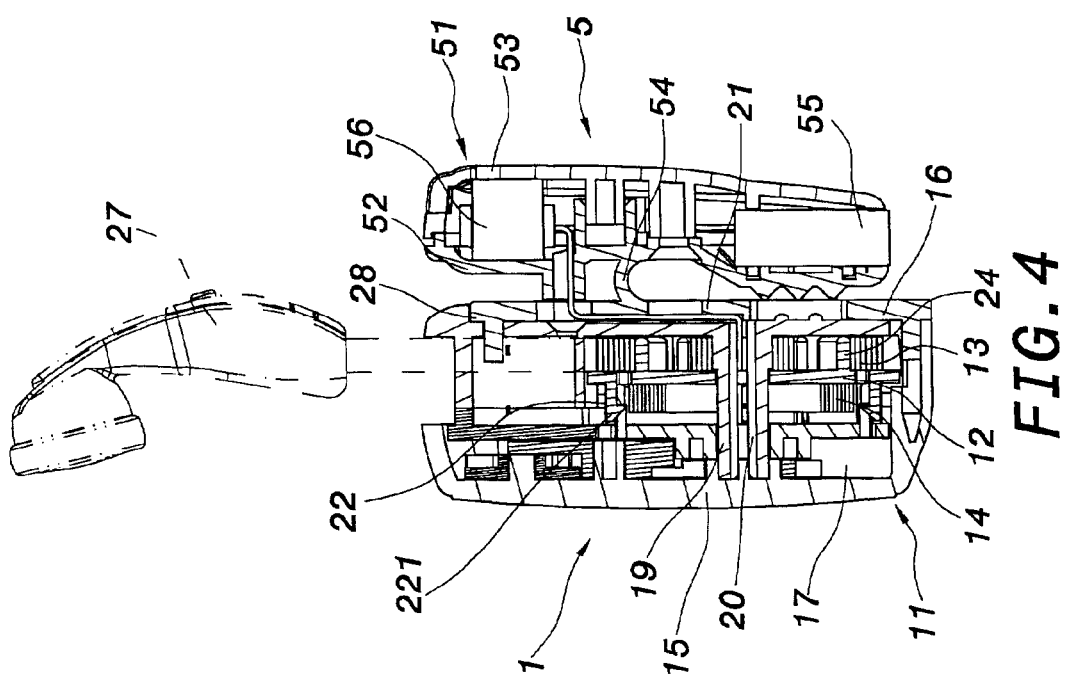
FIG. 4 is a sectional view of the miniature vocal transmitter device according to the first embodiment of the invention.

FIG. 1 is a perspective view of a miniature vocal transmitter device according to a first embodiment of the invention. FIG. 2 is an exploded view of the miniature vocal transmitter device according to the first embodiment of the invention. FIG. 3 is another exploded view of the miniature vocal transmitter device according to the first embodiment of the invention. FIG. 4 is a section view of the miniature vocal transmitter device according to the first embodiment of the invention.

With reference to FIG. 1 through FIG. 4, a miniature vocal transmitter device includes a cable-receiving structure 1 and a fastener 5. The cable-receiving structure 1 includes a cable-receiving case having a suitable shape for receiving a connection cable of the vocal transmitter device. In this embodiment, the cable-receiving structure 1 includes a case 11, a cable-winding plate 12, a connection cable 13 and a spiral spring 14. The case 11 consists of an upper case 15 and a lower case 16 that assemble with each other, via fastening engagement or screw assembly, to define a placement space therein. A cable-receiving cavity 17 hence is defined in the case 11 for receiving the connection cable 13. A cable hole 18 is defined through a sidewall of the cable-receiving cavity 17 for the connection cable 13 to be externally extended there through. An inner surface of the cable-receiving cavity 17 is centrally provided with an axle 19 through which a slot 20 is axially defined. The axle 19, provided with the axial slot 20, penetrates through the case 11 to connect a groove 21 outside the case 11.

The cable-winding plate 12 is formed into a disk shape. A central axle hole 23 is defined through a central portion of the cable -winding plate 12. A first surface of the cable-winding plate 12 is provided with a cable-winding ring 24 mounted thereon. A spring fastening member 25 is placed vis-a-vis a second surface of the cable-winding plate 12 opposite to the first surface thereof. A plurality of engagement holes 22 are defined in the spring fastening member 25 vis-à-vis a plurality of fastener tongues 221 formed on the first surface of the cable-winding plate 12. The spring fastening member 25 is thereby fixedly attached to the first surface of the cable-winding plate 12 by means of the fastener tongues 221 respectively engaging the engagement holes 22. A fastener slot 26 is further defined in the spring fastening member 25. The cable-winding plate 12 is held in the cable-receiving cavity 17. Via a pivot connection achieved by the engagement of the axle 19 through the central axle hole 23, the cable-winding plate 12 can be thereby rotated within the cable-receiving cavity 17.

The connection cable 13 is wound around the cable -winding ring 24 and the axle 19 within the cable-receiving cavity 17. A first terminal of the connection cable 13 connects an earphone 27. The first terminal of the connection cable 13 connected to the earphone 27 outwardly extends through the cable hole 18 of the case 11. A second terminal of the connection cable 13 passes through the slot 20 of the axle 19 outside the case 11, and extends along the groove 21 to connect a connector 55 and a microphone 56. Via a connecting member 28, the fastener 5 is fixedly attached to the lower case 16 of the case 11 by fastening engagement or screw assembly.

The spiral spring 14 is arranged in the spring fastening member 25. A first attachment end 29 of the spiral spring 14 is fastened into the fastener slot 26 of the spring fastening member 25 while a second attachment end 291 of the spiral spring 14 is fastened with the axle 19 of the case 11. Resilient energy can be thereby stored in the spiral spring 14 along with a rotation of the cable-winding plate 12. The case 11 can be further provided with a switch 30 that is connected to the connection cable 13 for controlling a turn on/off of the miniature vocal transmitter device of the invention.

The fastener 5 is arranged outside the case 11. The fastener 5 comprises a clipping device 51 consisting of clipping bodies 52, 53. The clipping bodies 52, 53 are engaged with or screwed upon each other to define a placement space therein. The clipping device 51 has a connection part 54 integrally formed with the connecting member 28 of the case 11 so that the clipping device 51 can be clipped on a user's cloth via the connection part 54 as a pivot.

The clipping device 51 internally encloses the connector 55 and the microphone 56. A through hole 57 corresponding to the placement of the connector 55 is defined through the clipping device 51 for externally connecting to a portable electrical device such as a mobile telephone to the connector 55. Furthermore, a sound groove 58 corresponding to the placement of the microphone 56 is defined through the clipping device 51 for receiving external sound. The connection cable 13, extended out of the case 11 into the clipping device 52, connects the connector 55 and the microphone 56. The microphone 56 used in the invention can be arranged inside the cable-receiving structure 1 as well as the connector 55, as shown in FIG. 9.

Figure 5:
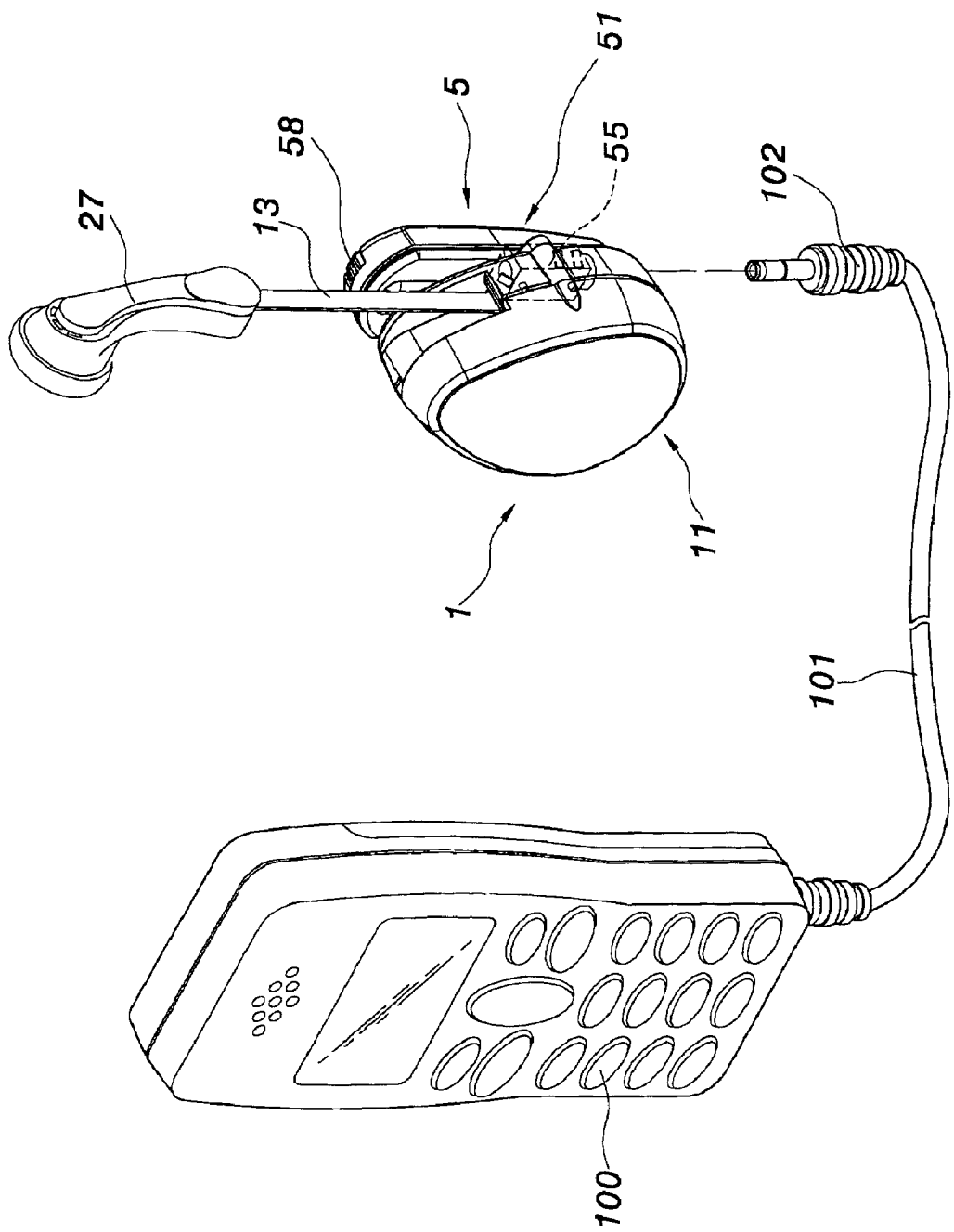
FIG. 5 is a general perspective view showing the use of the miniature vocal transmitter device according to the first embodiment of the invention.

In the miniature vocal transmitter device as shown in FIG. 5, a substantially long connection cable 13 can be received within the cable-receiving structure 1. A user can insert a connector 102, mounted on a terminal of a cable 101 of a portable electrical device 100, into the connector 55 to electrically connect the portable electrical device 100 to the miniature vocal transmitter device. As the earphone 27 connected to the connection cable 13 is pulled out, the spiral spring 14 exerts a retraction tension on the connection cable 13. As a result, the connection cable 13 can be conveniently retracted and wound once it is released.

To facilitate a pull out of the connection cable 13, a blocking notch 31 is further defined on the spring fastening member 25 while a back-and-forth controller 32 is placed proximate to the cable-winding plate 12. The back-and-forth controller 32 includes an oscillating member 33 that freely can oscillate, and a toothed wheel 34 that can freely rotate. With the interaction between the oscillating member 33, the toothed wheel 34 and the blocking notch 31, an immobilization or winding of the cable-winding plate 12 can be thereby achieved via a reverse pull-out/release manipulation on the connection cable 13. A cover 43 can be further mounted to the case 11 for enclosing and positioning the oscillating member 33 and the toothed wheel 34. According to another example of arrangement, the notch 31 can be alternatively formed on the cable-winding plate 12.

Figure 6:
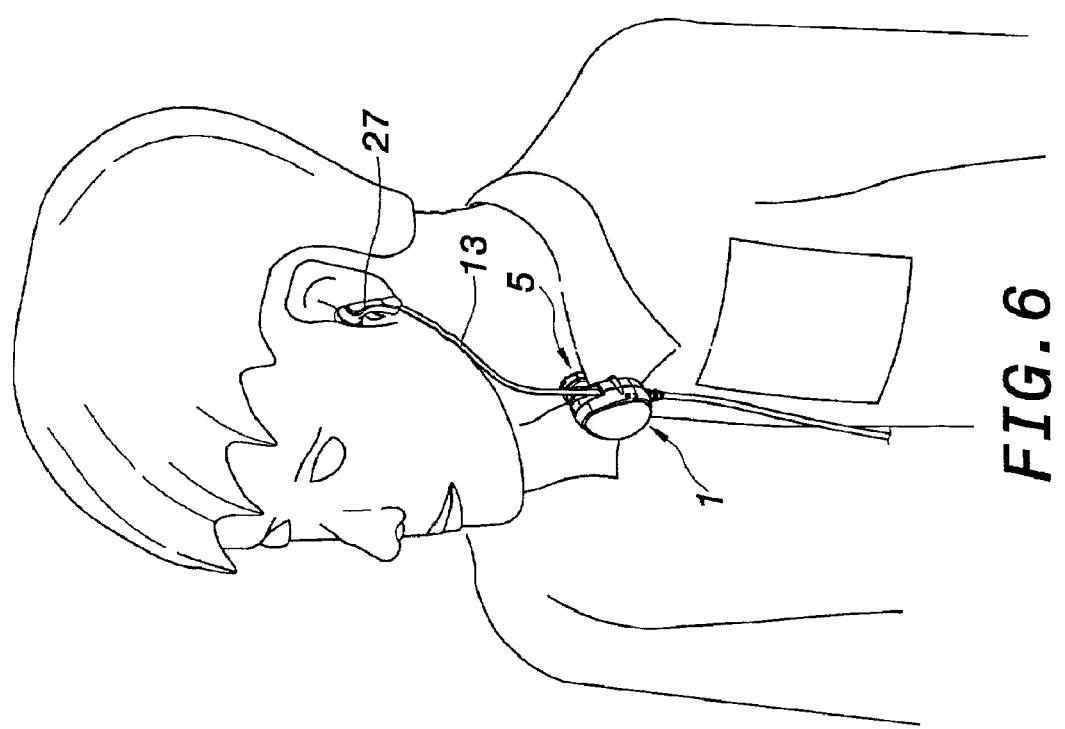
FIG. 6 is another general perspective view showing the use of the miniature vocal transmitter device according to the first embodiment of the invention.

FIG. 6 is a general perspective view showing the use of the miniature vocal transmitter device according to the first embodiment of the invention. As shown in FIG. 6, the clipping device 51 of the fastener 5 is clipped on a part of the user's cloth such as a collar. The user can use the microphone 56 and the earphone 27 to transmit and receive messages. The vocal transmitter device of the invention therefore has a compact cable-receiving structure that prevents interlaces and knots of the extended portion of the connection cable 13. The cable-receiving structure thus not only conveniently receives and winds the connection cable 13, but also is user-friendly.

Figure 7:
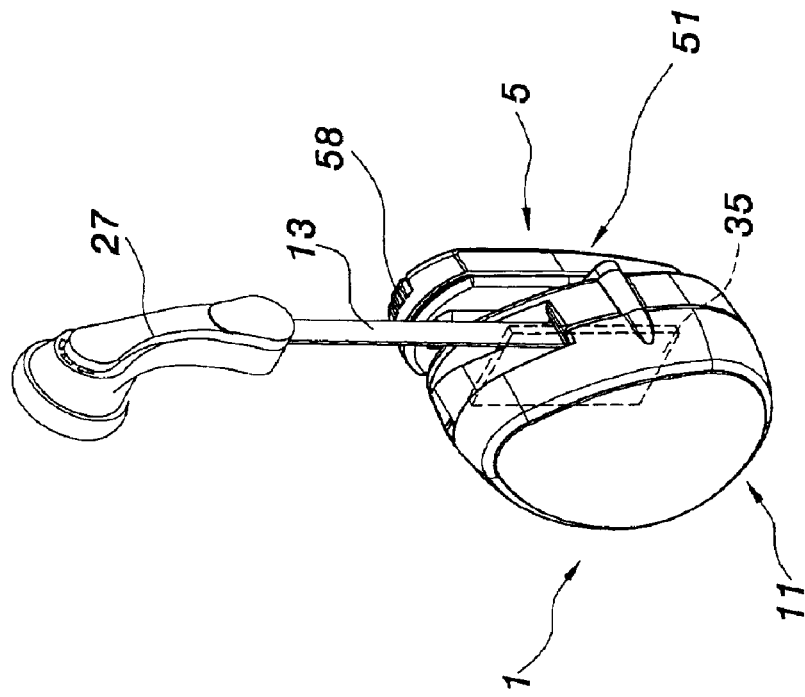
FIG. 7 is a general perspective view showing the use of a miniature vocal transmitter device according to a second embodiment of the invention.
Figure 7:
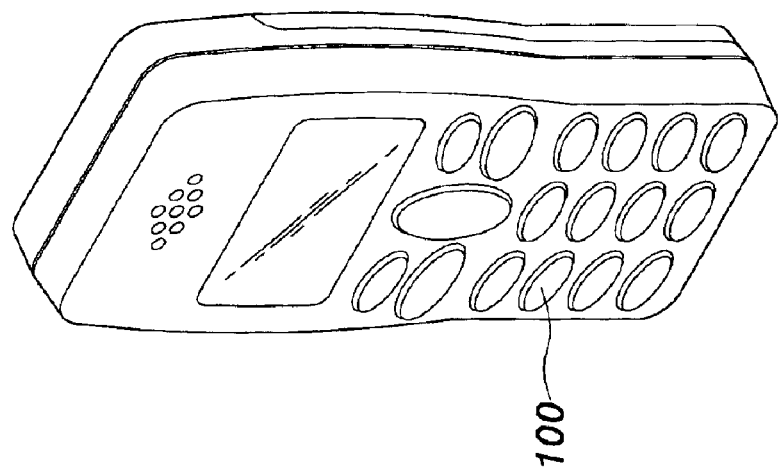

In FIG. 7 and FIG. 9, a wireless receiver 35 is further provided either in the cable-receiving structure 1 or the fastener 5 for wireless communication.

Figure 8:
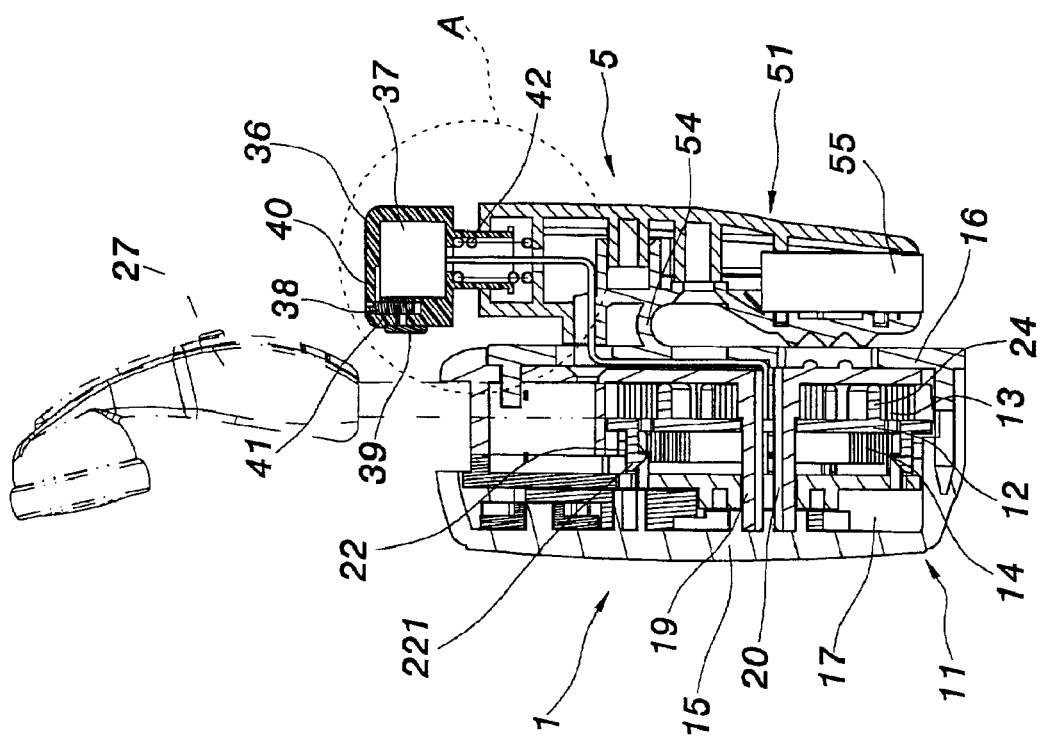
FIG. 8 is a sectional view of a miniature vocal transmitter device according to a third embodiment of the invention.
Figure 8A:
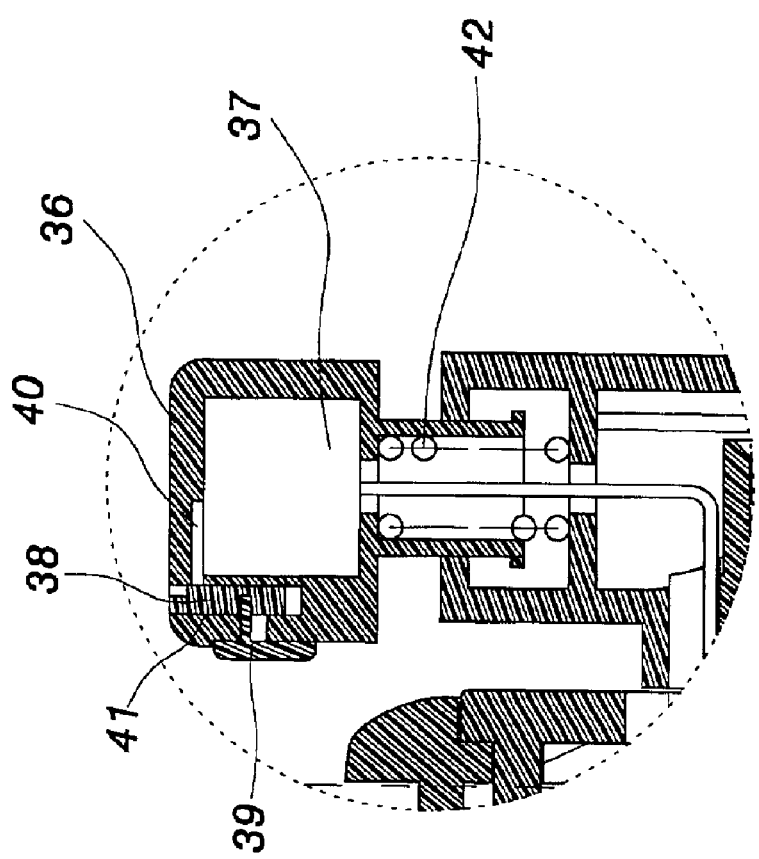
FIG. 8A is a locally enlarged view of FIG. 8.

In FIG. 8 and FIG. 8A, a microphone support 36, a capacitance microphone 37, a sealing member 38, and a switch 39 are further provided either on the cable-receiving structure 1 or the fastener 5. The microphone support 36 is a case defining a placement space therein. The capacitance microphone 37 is arranged inside the microphone support 36 and locally adhered to an inner wall of the microphone support 36, and a clearance 40 is defined between the placed capacitance microphone 37 and the microphone support 36.

The capacitance microphone 37 is connected to the second terminal of the connection cable 13. The sealing member 38 matches a hole 41 of the microphone support 36 that communicates with the clearance 40. When the sealing member 38 moves upward in the hole 41, the clearance 40 is hermetically isolated. When the sealing member 38 moves downward, and the clearance 40 is opened on the upper portion of the hole 41.

The switch 39 is located outside the microphone support 36 to control the sealing member 38 connected to the switch 39. The switch 39 can be a switch button. The switch 39 moves up or down in the microphone support 36, thereby moving the sealing member 38 upward or downward to close or open the clearance 40. A switchable microphone is hence achieved.

The microphone may be used as a guttural vibration microphone when the switch 39 and the sealing member 38 move up to close the upper portion of the hole 41 and the clearance 40 while the microphone support 36 is attached to the user's throat. Hence, guttural vibration through the closed clearance 40 is isolated and transmitted by vibration to achieve a sound transmission by guttural vibration.

The microphone may be used as a common microphone when the switch 39 and the sealing member 38 move down to open the upper portion of the hole 41 and the clearance 40, thereby exposing a top of the microphone support 36. Hence, sound is captured via typical sound wave.

A resilient member 42 can be further provided between the microphone 36 and the clipping device 51 of the fastener 5. The resilient is member 42 pushes the microphone support 36 and the microphone 37 upward to ensure the attachment of the microphone support 36 to the user's throat.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A miniature vocal transmitter device, comprising:
   a cable-receiving structure, including a case, a cable-winding plate, a connection cable and a spiral spring, the cable-winding plate and the spiral spring being arranged in the case, and the connection cable being wound around the cable-winding plate;
   an earphone connected to a first terminal of the connection cable;
   a fastener mounted on the case of the cable-receiving structure;
   a microphone arranged either in the case of the cable-receiving structure or the fastener, and further connected to a second terminal of the connection cable;
   a microphone support arranged on one of the case of the cable-receiving structure or the fastener, the microphone being disposed inside the microphone support and adhered to an inner wall thereof to define a clearance between the microphone and a portion of the microphone support, the microphone support having a hole extending from an opening in an outer wall thereof and being in open communication with said clearance;
   a sealing member displaceably disposed in the hole of the microphone support; and,
   a switch located external to the microphone support and coupled to the sealing member for reversibly displacing the sealing member to block and unblock communication between the clearance and the opening in the outer wall of the microphone support.

2. The device of claim 1, wherein the case of the cable-receiving structure has (a) a cable-receiving cavity formed therein for holding the cable-winding plate, (b) a cable hole formed through a sidewall of the cable-receiving cavity to enable the connection cable to extended therethrough, and (c) an inner surface of the case defining the cable-receiving cavity having a centrally disposed axle through which a slot is axially defined, the axially defined slot of the axle passing through the case to be in open communication with a groove externally defined on the case, the second terminal of the connection cable extending out of the case through the slot of the axle.

3. The device of claim 2, wherein the cable-winding plate has a central axle hole formed in a central portion thereof; and a cable-winding ring and a spring fastening member being further placed over two opposite surfaces of the cable-winding plate, the cable-winding plate being pivotally connected to the axle, the connection cable being wound around the cable-winding ring and the axle, the spiral spring being arranged inside the spring fastening member, the spiral spring having a first attachment end fastened to the spring fastening member while a second attachment end of the spiral spring being fastened to the axle.

4. The device of claim 1, wherein one of the case of the cable-receiving structure or the fastener has a connector connected to the connection cable.

5. The device of claim 1, wherein one of the case of the cable-receiving structure or the fastener has a wireless receiver.

6. The device of claim 1, wherein the microphone is a capacitance microphone which is arranged inside the microphone support.

7. The device of claim 1, wherein one of the case of the cable-receiving structure or the fastener has a resilient member provided between the microphone support and the corresponding one of the case of the cable-receiving structure or the fastener.

8. The device of claim 1, wherein the case of the cable-receiving structure has a switch connected to the connection cable.

9. The device of claim 1, further comprising a back-and-forth controller within the case, the back-and-forth controller including an oscillating member and a toothed wheel for immobilization or winding of the cable-winding plate via a reverse pull-out/release manipulation on the connection cable.

10. The device of claim 1, wherein the fastener includes a clipping device that has a resilient connecting part integrally formed with the connection of the fastener with the case so that the clipping device is clipped on a user's cloth by means of the resilient connecting part as a pivot.

* * * * *